United States Patent
Yoshino et al.

(10) Patent No.: US 7,864,222 B2
(45) Date of Patent: Jan. 4, 2011

(54) AUTOMATIC WHITE BALANCE SYSTEM AND AUTOMATIC WHITE BALANCE CONTROL METHOD

(75) Inventors: Akira Yoshino, Akishima (JP); Keiichiro Yanagida, Ome (JP); Noriko Matsuo, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 611 days.

(21) Appl. No.: 11/939,179

(22) Filed: Nov. 13, 2007

(65) Prior Publication Data

US 2008/0111896 A1   May 15, 2008

(30) Foreign Application Priority Data

Nov. 14, 2006   (JP) .............................. 2006-308255

(51) Int. Cl.
*H04N 9/73*   (2006.01)
(52) U.S. Cl. .............. 348/223.1; 348/231.3; 348/231.6; 382/162; 382/167
(58) Field of Classification Search .............. 348/222.1, 348/223.1, 229.1, 231.3, 231.6, 255; 382/162, 382/166, 167
See application file for complete search history.

(56) References Cited

U.S. PATENT DOCUMENTS

| | | | | |
|---|---|---|---|---|
| 5,298,979 | A * | 3/1994 | Kim | 348/655 |
| 5,398,058 | A * | 3/1995 | Hattori | 348/224.1 |
| 6,958,773 | B1 | 10/2005 | Sato | |
| 7,511,739 | B2 * | 3/2009 | Tsujino | 348/229.1 |
| 7,684,122 | B2 * | 3/2010 | Shirota | 359/676 |
| 2005/0162532 | A1 | 7/2005 | Toyoda | |
| 2006/0290957 | A1 | 12/2006 | Kim et al. | |

FOREIGN PATENT DOCUMENTS

JP   4-304093   10/1992

* cited by examiner

*Primary Examiner*—Lin Ye
*Assistant Examiner*—Chriss S Yoder, III
(74) *Attorney, Agent, or Firm*—Oblon, Spivak, McClelland, Maier & Neustadt, L.L.P.

(57) ABSTRACT

An automatic white balance system according to an embodiment of the invention comprises a color separation and synchronization unit which has a line memory for generating a white-balance-adjusted YUV signal, a color judgment unit which judges whether or not a white balance adjustment is needed, a white balance adjustment gain computation unit which calculates a white balance adjustment gain on the basis of the result of the judgment at the color judgment unit and the white-balance-adjusted YUV signal, a reciprocal computation unit which outputs the reciprocal transformation value of the white balance adjustment gain, and a second multiplier which multiplies the white-balance-adjusted YUV signal by the reciprocal transformation value.

19 Claims, 6 Drawing Sheets

AUTOMATIC WHITE BALANCE SYSTEM AND AUTOMATIC WHITE BALANCE CONTROL METHOD

CROSS-REFERENCE TO RELATED APPLICATIONS

This application is based upon and claims the benefit of priority from prior Japanese Patent Application No. 2006-308255, filed Nov. 14, 2006, the entire contents of which are incorporated herein by reference.

BACKGROUND OF THE INVENTION

1. Field of the Invention

This invention relates to an automatic white balance system.

2. Description of the Related Art

In recent years, demand for digital cameras has been growing.

The image taken by a digital camera has color tones conforming to the characteristics of the CCD or CMOS image sensor elements. To make the color tones conform to the characteristic of the human eye, various image correcting processes are carried out in the system.

In the image correcting processes, a white balance adjustment is such that, for example, red and blue are adjusted with respect to white to correct the white when an incandescent electric lamp or a fluorescent lamp is used as a light source, with white from the sun as a light source being a reference. Then, the white balance adjustment is generally made in an automatic white balance system (hereinafter, referred to as an AWB system) (for example, refer to Jpn. Pat. Appln. KOKAI Publication No. 4-304093).

In the AWB system, whether the white balance of the captured image has to be adjusted is judged at a color judgment unit on the basis of the YUV signal. The white balance adjustment is made by feeding back the white balance adjustment gain calculated on the basis of the YUV signal in the system. A color separation and synchronization unit color-separates the image signal of the captured image into a red, a green, and a blue signal and synchronizes them and, on the basis of these signals, generates the YUV signal.

When whether a white balance adjustment is needed is judged on the basis of the YUV signal generated exclusively for the color judgment unit, the color separation and synchronization unit is provided for the color judgment unit only. However, since the color separation and synchronization unit uses a line memory, the circuit size of the automatic white balance system increases considerably.

To solve this problem, a color judgment is made using the YUV signal white-balance adjusted by a feedback process without providing the color separation and synchronization unit exclusively for the color judgment unit. In this case, however, a color judgment is made on the basis of the white-balance-adjusted YUV signal influenced by the white balance adjustment gain. Accordingly, there is a possibility that a normal color judgment cannot be made, depending on photographing conditions.

BRIEF SUMMARY OF THE INVENTION

According to an aspect of the invention, there is provided an automatic white balance system comprising: a first multiplier which outputs a white-balance-adjusted image signal; a color separation and synchronization unit which has a line memory for generating a white-balance-adjusted YUV signal from the white-balance-adjusted image signal; a color judgment unit which judges whether or not a white balance adjustment is needed; a white balance adjustment gain computation unit which calculates a white balance adjustment gain on the basis of the result of the judgment at the color judgment unit and the white-balance-adjusted YUV signal; a reciprocal computation unit which outputs the reciprocal transformation value of the white balance adjustment gain; and a second multiplier which multiplies the white-balance-adjusted YUV signal by the reciprocal transformation value.

According to another aspect of the invention, there is provided an automatic white balance control method comprising: multiplying a first white-balance-unadjusted image signal by a first white balance adjustment gain to generate a first white-balance-adjusted image signal; generating a white-balance-adjusted YUV signal from the first white-balance-adjusted image signal; subjecting the first white balance adjustment gain to a reciprocal transformation process to calculate a reciprocal transformation value; multiplying the white-balance-adjusted YUV signal by the reciprocal transformation value to calculate a white-balance-unadjusted YUV signal; judging on the basis of the white-balance-unadjusted YUV signal whether to subject the white-balance-adjusted YUV signal to a white balance adjustment; if it is judged that a white balance adjustment is to be made, calculating a second white balance adjustment gain from the white-balance-adjusted YUV signal; and multiplying a second white-balance-unadjusted image signal input after the first white-balance-unadjusted image by the second white balance adjustment gain to generate a second white-balance-adjusted image signal.

DETAILED DESCRIPTION OF THE INVENTION

Hereinafter, referring to the accompanying drawings, embodiments of the invention will be explained in detail.

1. Outline

An embodiment of the invention relates to an automatic white balance system (AWB system). The embodiment is characterized by comprising a reciprocal computation unit for calculating the reciprocal of a white balance adjustment gain and a multiplier for multiplying the reciprocal transformation value by a white-balance-adjusted YUV signal.

It is desirable that whether a white balance adjustment is needed should be judged by a color judgment unit on the basis of a white-balance-unadjusted YUV signal.

In the embodiment of the invention, a white-balance-unadjusted YUV signal can be generated by multiplying the white-balance-adjusted YUV signal by the reciprocal transformation value of the white balance adjustment gain.

Accordingly, there is no need to provide a color separation and synchronization unit with a line memory of a large circuit size exclusively for the color judgment unit. Therefore, the increase of the circuit size of the AWB system can be suppressed. Moreover, since whether a white balance adjustment is needed can be judged on the basis of a white-balance-unadjusted YUV signal, a proper white balance adjustment can be made.

2. Embodiments (A) Configuration

Figure 1:
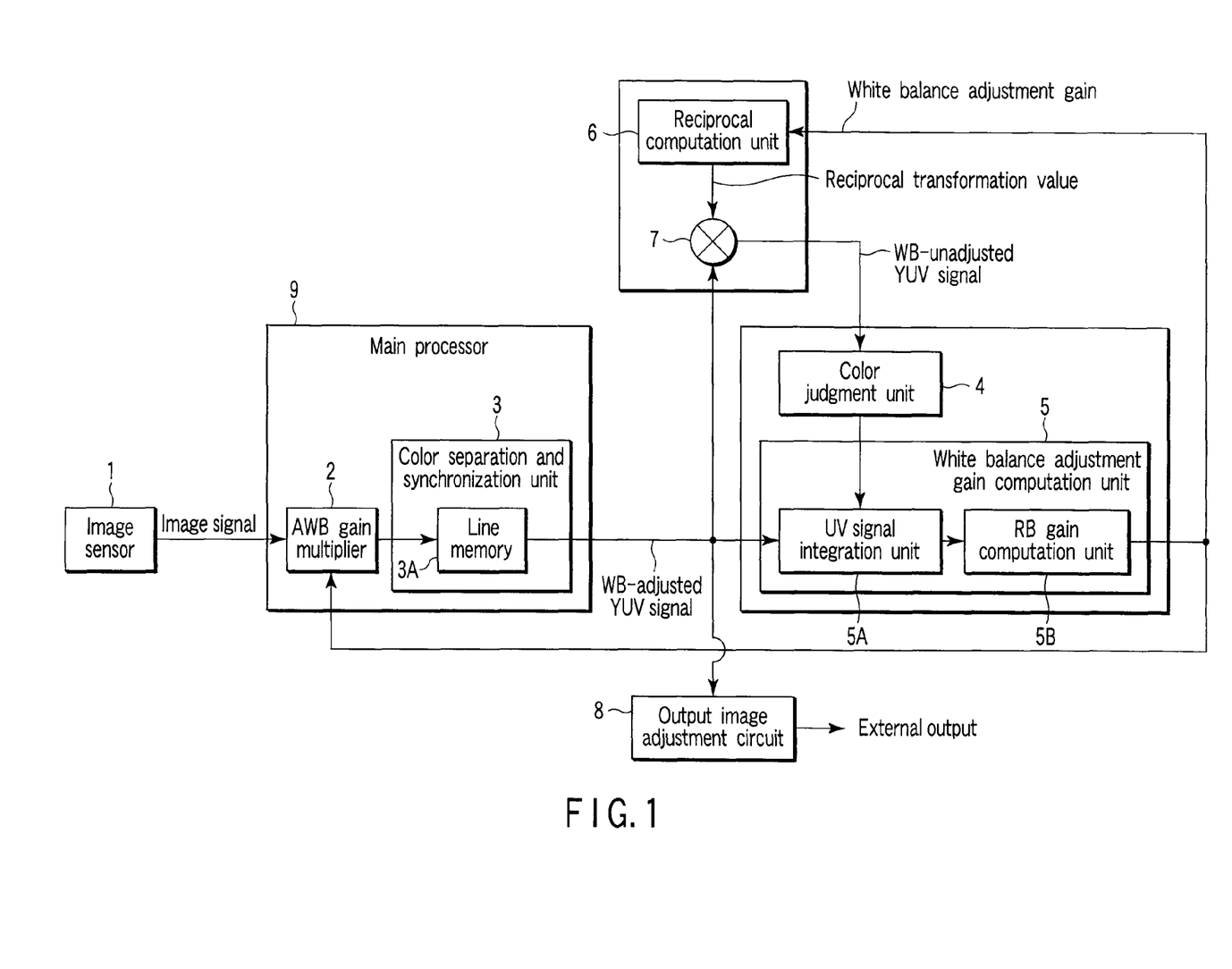
FIG. 1 is a block diagram of an automatic white balance system according to an embodiment of the invention.

FIG. 1 is a block diagram showing the configuration of an AWB system according to an embodiment of the invention. To simplify the explanation, only the principal part is shown in the embodiment.

An image sensor 1 outputs an image signal. The image sensor 1 is, for example, a single-plate area image sensor. The area of the image sensor 1 is composed of an effective pixel area and a blanking area around the effective pixel area. Of the input image signals, the signals of the effective pixel area are to be subjected to a white balance adjustment. The image signals are composed of red (R), green (G), and blue (B) color signals. The image sensor 1 is, for example, composed of a CCD or COS sensor. Each element of the sensor, that is, each pixel, is set so as to react to only one of red (R), green (G), and blue (B) with a color filter having an arrangement pattern of, for example, the Bayer type.

A main processor 9 includes an AWB gain multiplier (first multiplier) 2 and a color separation and synchronization unit 3. The AWB gain multiplier 2 multiplies an image signal by a white balance adjustment gain, thereby adjusting the white balance of the captured image. Therefore, the AWB gain multiplier 2 generates an image signal multiplied by the white balance adjustment gain, that is, a white-balance-adjusted image signal.

An image signal is input via the AWB gain multiplier 2 to the color separation and synchronization unit 3, which separates the input image signal into a red (R), a green (G), and a blue (B) component. On the basis of the separated signal components, the color separation and synchronization unit 3 generates a YUV signal.

Since the YUV signal is generated from the white-balance-adjusted image signal multiplied by the white balance adjustment gain, it is a YUV signal after a white balance adjustment (hereinafter, referred to as a WB-adjusted YUV signal). The YUV signal is composed of a luminance (Y) signal representing the luminance of the image, a U signal subtracted the luminance signal from the blue component, and a V signal subtracted the luminance signal from the red component. Moreover, the color separation and synchronization unit 3 includes a line memory 3A. The line memory 3 stores several lines of signal data, that is, as much signal data as several times the number of effective pixels in the horizontal direction of the image sensor.

The WB-adjusted YUV signal generated by the color separation and synchronization unit 3 is output to a white balance adjustment gain computation unit 5 and a multiplier (second multiplier) 7.

A color judgment unit 4 judges on the basis of the YUV signal whether the captured image includes an area needing a white balance adjustment and outputs the result of the judgment to the white balance adjustment gain computation unit 5.

The white balance adjustment gain computation unit 5 calculates a white balance adjustment gain on the basis of the result of the judgment at the color judgment unit 4 and the WB-adjusted YUV signal from the color separation and synchronization unit 3.

The white balance adjustment gain computation unit includes a UV signal integration unit 5A and an RB gain computation unit 5B.

When the color judgment unit 4 judged that the white balance adjustment was necessary, the UV signal integration unit 5A integrates a UV signal representing changes in the hue and chroma in the YUV signal.

The RB gain computation unit 5B calculates a red component gain (R gain) and a blue component gain (B gain) on the basis of the result of the calculation at the UV signal integration unit 5A. The white balance adjustment gain computation unit 5 calculates a white balance adjustment gain on the basis of the results of calculating the R gain and the B gain and outputs the resulting gain.

Figure 2:
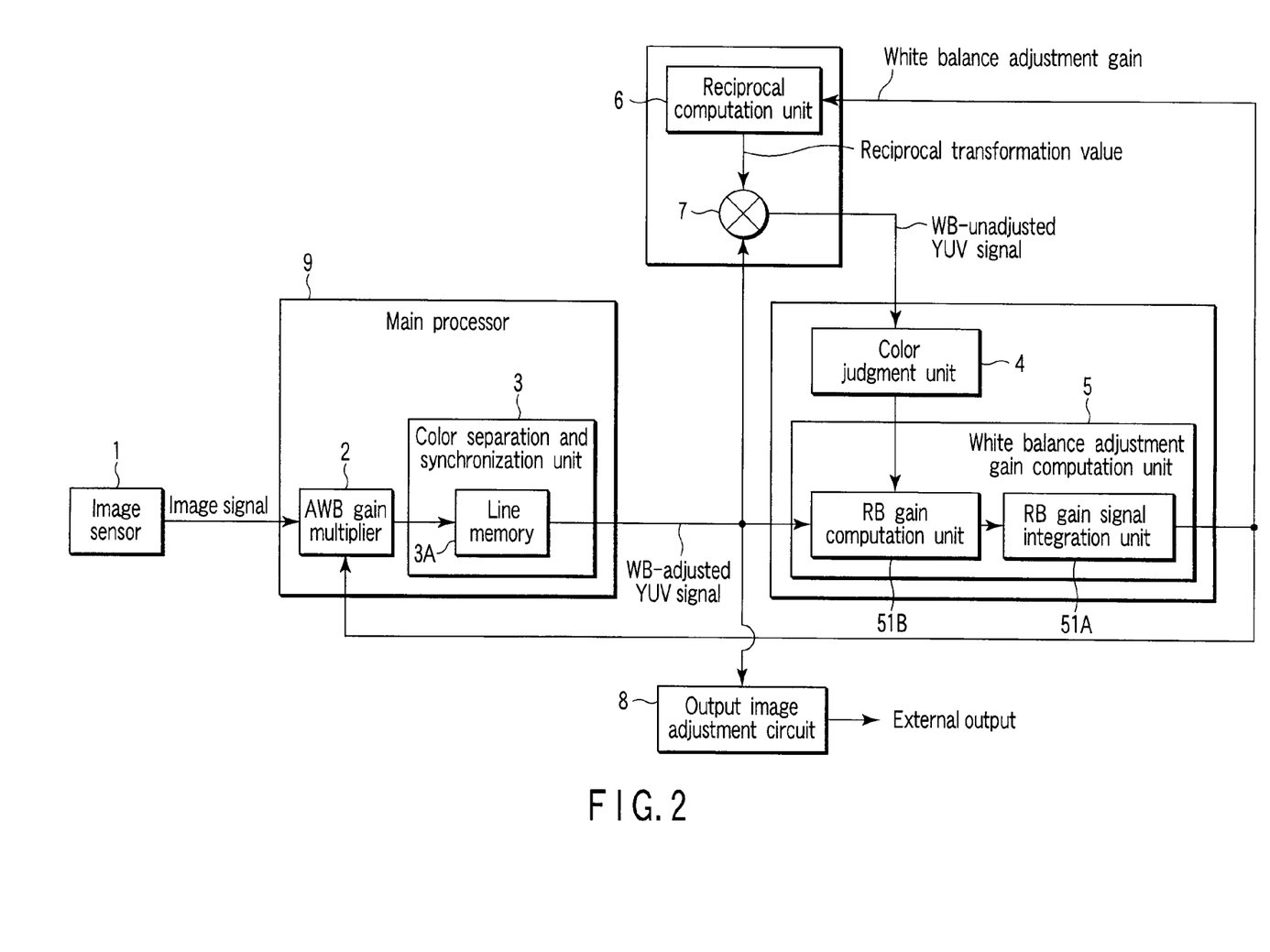
FIG. 2 is a block diagram of another automatic white balance system according to the embodiment of the invention.

The white balance adjustment gain computation unit 5 may have the same configuration as shown in FIG. 2. In this case, an RB gain computation unit 51B calculates an R gain and a B gain on the basis of the WB-adjusted YUV signal and an RB gain signal integration unit 51A integrates the R gain and the B gain and calculates a white balance adjustment gain on the basis of the result.

The white balance adjustment gain calculated by the white balance adjustment gain computation unit 5 is fed back to the AWB gain multiplier 2 and, at the same time, output to the reciprocal computation unit 6.

The reciprocal computation unit 6 calculates the reciprocal transformation value of the input white balance adjustment gain. The reciprocal transformation performed by the reciprocal computation unit 6 is the process of giving a reciprocal transformation value $1/G$ if the white balance adjustment gain is $G$. The calculated reciprocal transformation value is output to the multiplier 7. The reciprocal transformation value may be a value obtained by multiplying $1/G$ by an arbitrary constant.

The multiplier 7 multiplies the WB-adjusted YUV signal output from the color separation and synchronization unit 3 by the reciprocal transformation value output from the reciprocal computation unit 6, thereby generating a YUV signal before a white balance adjustment (hereinafter, referred to as a WB-unadjusted YUV signal). Then, the WB-unadjusted YUV signal generated as a result of calculation at the multiplier 7 is output to the color judgment unit 4.

An output image adjustment circuit 8 subjects the WB-adjusted YUV signal processed by the automatic white balance system to a pixel skipping process according to the output size to be adapted to the image display on the display unit (not shown), the parallel/serial output converting process of converting the signals output in parallel from the main processor 9 into a serial output signal, and an image compression process, such as a JPEG compression process. Then, the signal processed at the output image adjustment circuit 8 is output as an image signal of the selected output type to an external unit, such as a display unit (not shown) or a storage unit (not shown).

The automatic white balance system of the embodiment is characterized by having the reciprocal computation unit 6 and the multiplier 7.

In the color judgment unit 4, it is desirable that the WB-unadjusted YUV signal should be used to judge whether to make a white balance adjustment.

In the embodiment, the WB-unadjusted YUV signal is obtained as a result of the multiplier 7 multiplying the WB-adjusted YUV signal output from the color separation and synchronization unit 3 by the value resulting from the reciprocal transformation of the white balance adjustment gain at the reciprocal computation unit 6.

Therefore, the reciprocal computation unit 6 and second multiplier 7 can generate a WB-unadjusted YUV signal for color judgment at the color judgment unit 4 without providing the color separation and synchronization unit 3 including the large-circuit-sized line memory 3A for color judgment only.

Accordingly, the increase of the circuit size of the automatic white balance system can be suppressed.

Moreover, since a color judgment can be made on the basis of the WB-unadjusted YUV signal, a proper white balance adjustment can be made.

(B) Configuration of the Reciprocal Computation Unit

As described above, to generate a white-balance-unadjusted YUV signal, the reciprocal computation unit 6 performs the reciprocal transformation of the white balance adjustment gain. The reciprocal transformation value is the output of FIG. 3 with respect to the white balance adjustment gain as the input value.

Hereinafter, the configuration of the reciprocal computation unit 6 for performing the reciprocal transformation of the input value and a method of calculating the reciprocal transformation value will be explained.

(1) ROM

Hereinafter, a reciprocal transformation process by a ROM will be explained.

As an example of the reciprocal transformation unit, a read-only memory (ROM) is provided in the reciprocal computation unit 6 of FIG. 1.

In this case, a ROM table which shows the relationship between the input value corresponding to the white balance adjustment gain and the output value obtained as a result of the reciprocal transformation of the input value is stored in the ROM.

The white balance adjustment gain treated as a feedback gain is such that, for example, ¼ to 4 times an arbitrary reference value is used as a gain setting range.

Figure 3:
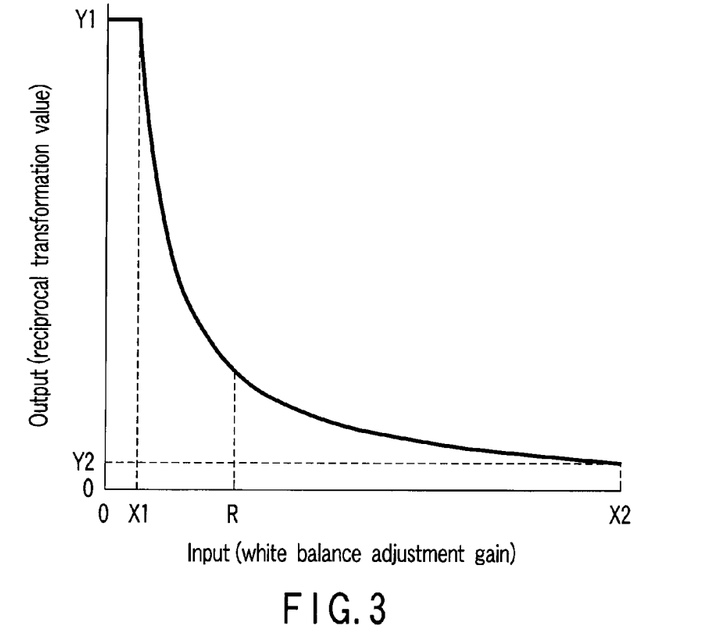
FIG. 3 is a diagram showing the output (reciprocal transformation value) with respect to the input (white balance adjustment gain)

Similarly, the setting range of the white balance adjustment gain as the input value shown in FIG. 3 is set in the ROM table in such a manner that ¼ times an arbitrary reference value of R is used as the minimum value X1 and 4 times the arbitrary reference value is used as the maximum value X2. Each input value in the setting range is stored in the ROM. In the setting range of X1 to X2, each input value is subjected to reciprocal transformation and the value resulting from the reciprocal transformation is stored in the ROM.

Therefore, the reciprocal transformation value as an output value is the maximum value Y1 when the white balance adjustment gain as the input value is the minimum value X1 and the minimum value Y2 when the white balance adjustment gain is the maximum value X2.

A value smaller than the minimum value X1 of the white balance adjustment gain is outside the setting range. Therefore, when a value smaller than the minimum value X1 is input, for example, setting is done in the ROM table so that the maximum value Y1 of the reciprocal transformation value may be output. Moreover, a value larger than the maximum value X2 of the input value is also outside the setting range. In this case, for example, setting is done in the ROM table so that the minimum value Y2 of the reciprocal transformation value may be output.

As described above, the reciprocal computation unit using the ROM refers to the ROM table and outputs the reciprocal transformation value of the white balance adjustment gain as the input value. This makes it possible to obtain the reciprocal transformation value of the white balance adjustment gain.

(2) Hardware Circuit

Figure 4:
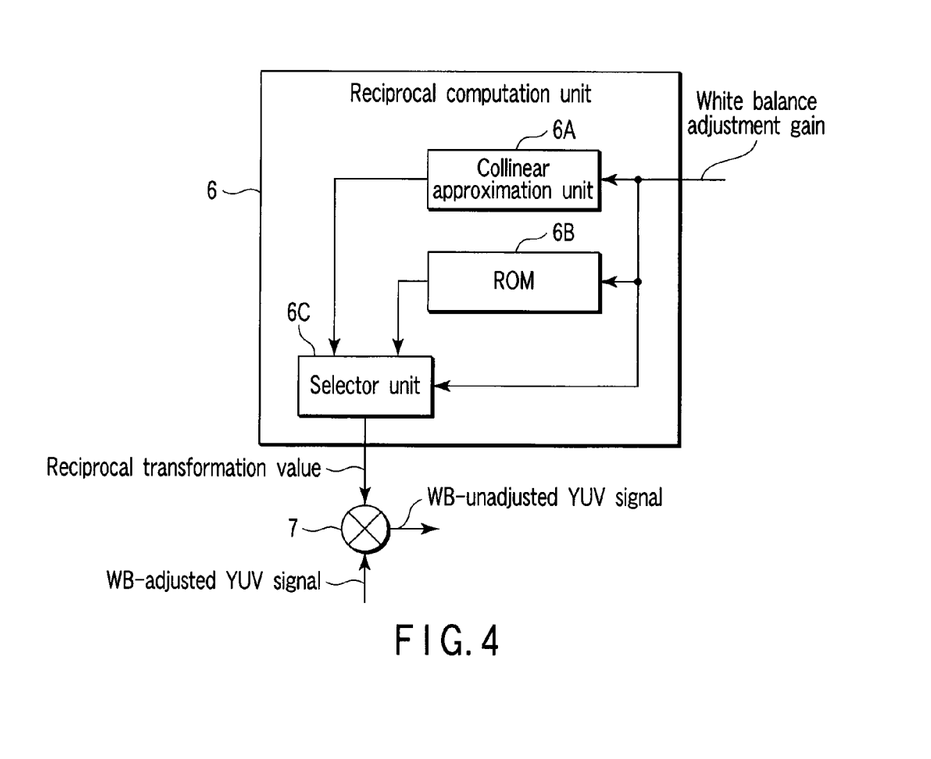
FIG. 4 is a block diagram of an embodiment of a hardware circuit applied to the reciprocal transformation unit.

The reciprocal computation unit 6 may be composed of a hardware circuit as shown in FIG. 4.

The calculation of the reciprocal transformation value by the ROM enables high-accuracy reciprocal transformation. However, as the amount of data in the ROM table becomes larger, a larger-capacity ROM has to be used, resulting in a larger circuit size.

Figure 5:
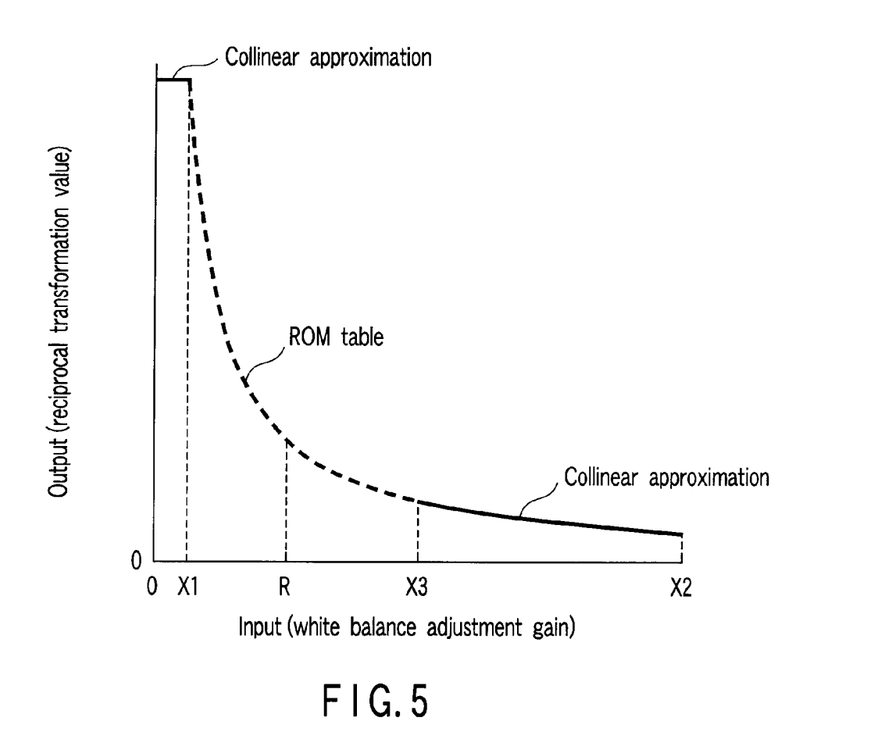
FIG. 5 is a diagram showing the output with respect to the input when the hardware circuit is used.

Accordingly, in an area where the amount of change in the output value is small, such as in the range of 0 to X1 or X3 to X2 shown in FIG. 5, the reciprocal of the white balance adjustment gain as the input value is calculated by collinear approximation. Moreover, in an area where the amount of change in the output value is large, such as in the range of X1 to X3, the reciprocal is calculated using the ROM table. In the area from X3 to X2, the gain is approximated using a plurality of approximate lines.

As described above, getting the reciprocal transformation values using collinear approximation and the ROM table makes it possible to prevent the circuit size from increasing, while keeping the accuracy of the reciprocal transformation.

Hereinafter, the configuration and operation of the hardware circuit shown in FIG. 4 will be explained.

The hardware circuit of FIG. 4 includes a collinear approximation unit 6A, a ROM 6B, and a selector unit 6C.

The white balance adjustment gain as the input value is input to the collinear approximation unit 6A, ROM 6B, and selector unit 6C. The setting range of the white balance adjustment gain as the input value and the setting range of the reciprocal transformation value as the output value are the same as those in the ROM.

The collinear approximation unit 6A and ROM 6B output a reciprocal transformation value on the basis of the input white balance adjustment gain, respectively.

The selector unit 6C selects the reciprocal transformation value corresponding to the input white balance adjustment gain from the reciprocal transformation values obtained from the collinear approximation unit 6A and ROM 6B. For example, in the case of an input value smaller than X1 or an input value larger than X3, the output value of the collinear unit 6A is selected by the selector unit 6C. If the input value is in the range of X1 to X3, the output of the ROM 6B is selected by the selector unit 6C.

The reciprocal transformation value selected by the selector unit 6C is output to the multiplier 7.

As described above, the hardware circuit can output the reciprocal transformation value of the input white balance adjustment gain.

(3) Software

The reciprocal transformation process of the white balance adjustment gain can be carried out by software.

Figure 6:
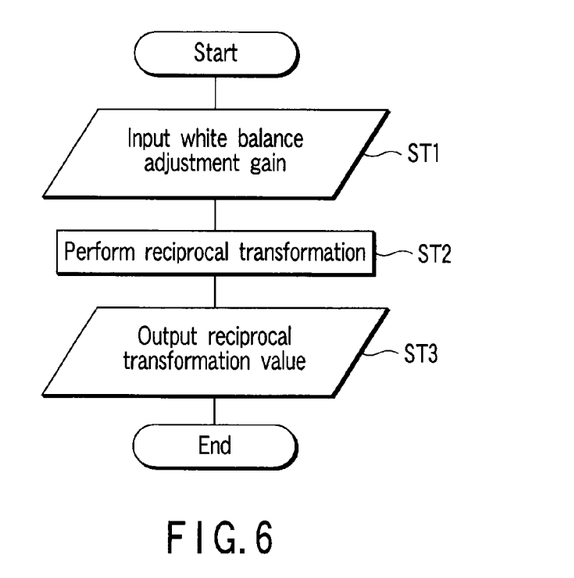
FIG. 6 is a flowchart to help explain the processing performed by the software applied to the reciprocal transformation unit.
Figure 7:
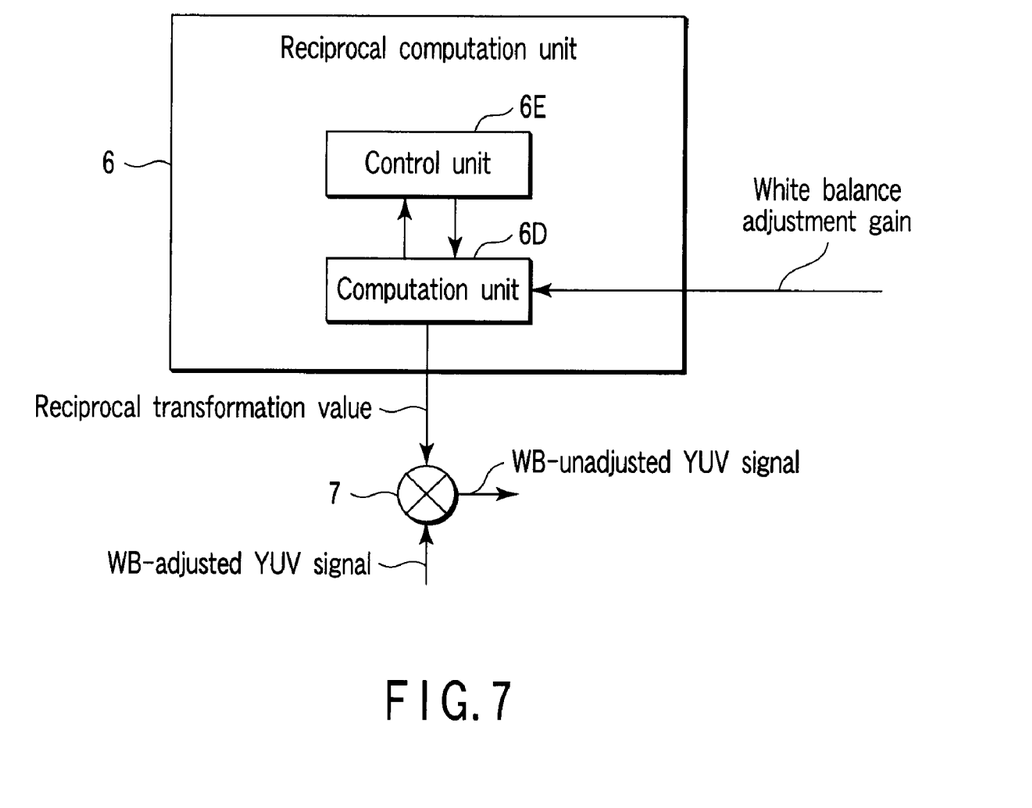
FIG. 7 is a block diagram of the reciprocal transformation unit caused to execute the software.

FIG. 6 is a flowchart to help explain a reciprocal transformation process by software. FIG. 7 is a block diagram of the reciprocal computation unit 6 for executing the software.

The reciprocal computation unit 6 includes a computation unit 6D and a control unit 6E.

The white balance adjustment gain as the input value is input to the computation unit 6D.

The control unit 6E has the software that calculates a reciprocal transformation value as an output value for the input value. The control unit 6E causes the computation unit 6D to perform reciprocal transformation described below.

First, the white balance adjustment gain is input to the reciprocal computation unit 6 and the computation unit 6D receives the input value (ST1).

Next, the control unit 6E causes the computation unit 6D to perform the reciprocal transformation of the input white balance adjustment gain (ST2).

Thereafter, the reciprocal transformation value calculated by the reciprocal transformation is output from the computation unit 6D to the multiplier 7, which completes the software computation process (ST3).

By the above steps, the reciprocal transformation value of the white balance adjustment gain can be calculated by software.

(C) Operation

Figure 8:
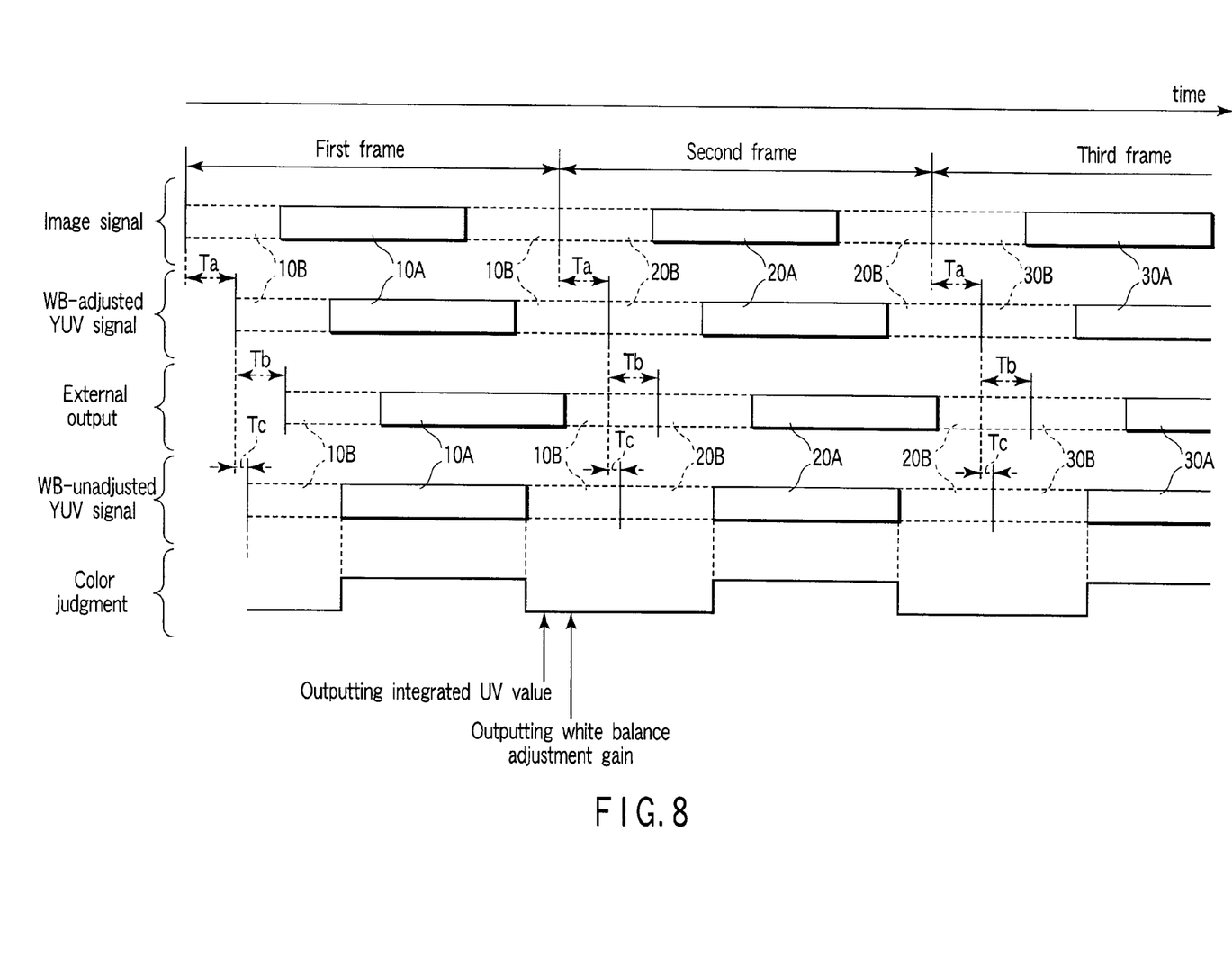
FIG. 8 schematically shows the processing timing for automatic white balance.

Hereinafter, referring to FIG. 8, the operation of the AWB system will be explained. FIG. 8 schematically shows the timing for the processing of the automatic white balance system according to the embodiment. Areas 10A, 20A, and 30A in FIG. 8 correspond to the periods in which the signals of the effective pixel area of the image sensor 1 are input to the corresponding processing units (hereinafter, referred to as the effective pixel periods). Areas 10B, 20B, and 30B correspond to the periods in which the signals of the blanking areas are input to the corresponding processing units (hereinafter, referred to as the blanking periods).

First, one frame of image signal output from the image sensor 1 is input to the main processor 9. Of the input image signals, the main processor 9 chiefly processes the individual pixels in the image signal of the effective pixel area of the image sensor 1. The AWB gain multiplier 2 multiplies the image signal by the white balance adjustment gain. Thereafter, the image signal multiplied by the white balance adjustment gain is output to the color separation and synchronization unit 3. The image signal is input to the color separation and synchronization unit 3, which color-separates the image signal, synchronizes the separated signals, and converts the resulting signals into a YUV signal. At this time, since the YUV signal is obtained from the image signal multiplied by the white balance adjustment gain, it is a white-balance-adjusted YUV signal. The WB-adjusted YUV signal is output to the white balance adjustment gain computation unit 5, multiplier 7, and output image adjustment circuit 8. The WB-adjusted YUV signal is delayed for a delay time of Ta since the input of one frame of image signal for the processing in the main processor 9.

The WB-adjusted YUV signal output to the output image adjustment circuit 8 is subjected to a pixel skipping process, a parallel/serial output converting process, an image compression process, and other processes at the output image adjustment circuit 8. By these processes, the input one frame of WB-adjusted YUV signal is delayed for a delay time of Tb and converted into a selected image signal (external output signal), which is then output to an external unit.

On the other hand, the WB-adjusted YUV signal output to the white balance adjustment gain computation unit 5 is input to the UV signal integration unit 5A of the white balance adjustment gain computation unit 5. Then, if the color judgment unit 4 has judged on the basis of the WB-unadjusted YUV signal that the target pixel needs a white balance adjustment, the U signal and V signal in the WB-adjusted YUV signal are integrated by the UV signal integration unit 5A. Since a color judgment on the basis of the WB-unadjusted YUV signal is performed on all of the pixels in the effective pixel area, the judgment is made in synchronization with the effective pixel period 10A of the WB-unadjusted YUV signal. Moreover, the integrated UV value calculated by the UV signal integration unit 5A is delayed from the color judgment period by the computation process and then output.

On the result of the calculation at the UV signal integration unit 5A, the R gain and B gain are calculated by the RB gain computation unit 5B. On the basis of the resulting value, the white balance adjustment gain is calculated. The white balance adjustment gain is output to the reciprocal computation unit 6. Moreover, at the same time, the gain is fed back to the AWB gain multiplier 2.

The white balance adjustment gain fed back to the AWB gain multiplier 2 is updated during a blanking period before the image signal of the next frame is input to the main processor 9 and the updated gain is input to the AWB gain multiplier 2. That is, the white balance adjustment gain is such that a gain calculated for the image signal of one frame is reflected in the image signal of the next one frame in such a manner that the next image signal is multiplied by the gain of the preceding image signal.

In the configuration of the white balance adjustment gain computation unit of FIG. 2, the R gain and B gain are calculated from the WB-adjusted YUV signal input to the RB gain computation unit 51B. The computation result is integrated at the RB gain signal integration unit 51A. On the basis of the integration result, the white balance adjustment gain is calculated.

The white balance adjustment gain output to the reciprocal transformation unit 6 is subjected to any one of the reciprocal transformation process on the ROM or hardware circuit, or by software at the reciprocal transformation unit 6. Then, the reciprocal transformation value corresponding to the white balance adjustment gain is output to the multiplier 7.

Then, the WB-adjusted YUV signal output from the color separation and synchronization unit 3 is multiplied by the reciprocal transformation value at the multiplier 7. Since the WB-adjusted YUV signal is a YUV signal multiplied by the white balance adjustment gain corresponding to the preceding image signal, a white-balance-unadjusted YUV signal is generated by further multiplying the WB-adjusted YUV signal by the reciprocal transformation value. The WB-unadjusted YUV signal is output to the color judgment unit 4. The WB-unadjusted YUV signal is delayed by a reciprocal transformation process for a delay time of Tc since the input of one frame of the WB-adjusted YUV signal and the resulting signal is input to the color judgment unit 4.

The above processes are carried out repeatedly each time the image sensor 1 outputs one frame of image signal sequentially.

As described above, with the embodiment, a YUV signal before a white balance adjustment can be reproduced. On the basis of the YUV signal, the color judgment unit 4 judges whether the target pixel (image signal) is to be subjected to a white balance adjustment.

Therefore, the reciprocal computation unit 6 and the second multiplier 7 can generate a white-balance-unadjusted YUV signal for a color judgment at the color judgment unit 4 without providing the color separation and synchronization unit 3 including the large-circuit-sized line memory 3A for a color judgment only.

Accordingly, the increase of the circuit size of the automatic white balance system can be suppressed.

Moreover, since color judgment can be made on the basis of the white-balance-unadjusted YUV signal, a proper white balance adjustment can be made.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An automatic white balance system comprising:
    a first multiplier which outputs a white-balance-adjusted image signal;
    a color separation and synchronization unit which has a line memory for generating a white-balance-adjusted YUV signal from the white-balance-adjusted image signal;
    a color judgment unit which judges whether or not a white balance adjustment is needed;
    a white balance adjustment gain computation unit which calculates a white balance adjustment gain on the basis of the result of the judgment at the color judgment unit and the white-balance-adjusted YUV signal;
    a reciprocal computation unit which outputs the reciprocal transformation value of the white balance adjustment gain; and
    a second multiplier which multiplies the white-balance-adjusted YUV signal by the reciprocal transformation value,
    wherein the second multiplier generates a white-balance-unadjusted YUV signal, and the color judgment unit makes a judgment on the basis of the white-balance-unadjusted YUV signal.

2. The automatic white balance system according to claim 1, wherein the reciprocal computation unit has a ROM which stores a ROM table that shows the relationship between the white balance adjustment gain and its reciprocal transformation value.

3. The automatic white balance system according to claim 2, wherein, if a reference value of the white balance adjustment gain is R, the white balance adjustment gain is defined in the range from ¼.times.R to 4.times.R and a reciprocal transformation value is calculated in the setting range.

4. The automatic white balance system according to claim 1, wherein the reciprocal computation unit includes a collinear approximation unit which subjects the reciprocal transformation value of the white balance adjustment gain to collinear approximation, a ROM which stores a ROM table that shows the relationship between the white balance adjustment gain and its reciprocal transformation value, and a selector unit which selects either the reciprocal transformation value calculated from the collinear approximation unit or the reciprocal transformation value calculated from the ROM according to the input of the white balance adjustment gain.

5. The automatic white balance system according to claim 4, wherein a output of the collinear approximation unit corresponds to the reciprocal transformation value in an area where the amount of change in the reciprocal transformation value is small, and
    a output of the ROM table corresponds to the reciprocal transformation value in an area where the amount of change in the reciprocal transformation value is large.

6. The automatic white balance system according to claim 1, wherein the reciprocal computation unit has a control unit and a computation unit, and
    the control unit causes the computation unit to receive a white balance adjustment gain, calculate the reciprocal of the white balance adjustment gain, and output the reciprocal of the white balance adjustment gain.

7. The automatic white balance system according to claim 1, wherein the white balance adjustment gain computation unit includes a UV signal integration unit which calculates the integrated values of a U signal and a V signal in the input white-balance-adjusted YUV signal and the RB gain computation unit which calculates a red component gain and a blue component gain on the basis of the UV signal integrated value.

8. The automatic white balance system according to claim 1, wherein the white balance adjustment gain computation unit includes an RB gain computation unit which calculates a red component gain and a blue component gain on the basis of the input white-balance-adjusted YUV signal, and an RB gain signal integration unit which integrates the red component gain and the blue component gain.

9. The automatic white balance system according to claim 1, further comprising: an image sensor which outputs a white-balance-unadjusted image signal.

10. The automatic white balance system according to claim 9, wherein the image sensor includes an effective pixel area which is to be subjected to a white balance adjustment and a blanking area around the effective pixel area which is not to be subjected to a white balance adjustment.

11. The automatic white balance system according to claim 10, wherein the color judgment unit makes a judgment in synchronization with the period in which the white-balance-unadjusted YUV signal corresponding to the effective pixel area is input.

12. The automatic white balance system according to claim 9, wherein the image sensor is a single-plate area image sensor.

13. The automatic white balance system according to claim 9, wherein the first multiplier multiplies the white balance adjustment gain by the white-balance-unadjusted image signal, thereby calculating the white-balance-adjusted image signal.

14. The automatic white balance system according to claim 9, wherein the white balance adjustment gain generated from white-balance-unadjusted image signal input from the image sensor is reflected in a image signal input after the white-balance-unadjusted image signal.

15. The automatic white balance system according to claim 1, further comprising: an output image adjustment circuit which subjects the white-balance-adjusted YUV signal to a converting process to generate an external output signal.

16. The automatic white balance system according to claim 15, wherein the output image adjustment circuit subjects the input white-balance-adjusted YUV signal to a pixel skipping process.

17. The automatic white balance system according to claim 15, wherein the output image adjustment circuit subjects the input white-balance-adjusted YUV signal to a parallel/serial converting process.

18. The automatic white balance system according to claim 15, wherein the output image adjustment circuit subjects the input white-balance-adjusted YUV signal to an image compression process.

19. An automatic white balance control method comprising:
    multiplying a first white-balance-unadjusted image signal by a first white balance adjustment gain to generate a first white-balance-adjusted image signal;
    generating a white-balance-adjusted YUV signal from the first white-balance-adjusted image signal;

subjecting the first white balance adjustment gain to a reciprocal transformation process to calculate a reciprocal transformation value;

multiplying the white-balance-adjusted YUV signal by the reciprocal transformation value to calculate a white-balance-unadjusted YUV signal;

judging on the basis of the white-balance-unadjusted YUV signal whether to subject the white-balance-adjusted YUV signal to a white balance adjustment;

if it is judged that a white balance adjustment is to be made, calculating a second white balance adjustment gain from the white-balance-adjusted YUV signal; and multiplying a second white-balance-unadjusted image signal input after the first white-balance-unadjusted image signal by the second white balance adjustment gain to generate a second white-balance-adjusted image signal.

* * * * *